H. WILLARD.
Grain Drill.

No. 14,894.

Patented May 13, 1856.

UNITED STATES PATENT OFFICE.

HOSEA WILLARD, OF VERGENNES, VERMONT.

IMPROVEMENT IN SEEDING-MACHINES.

Specification forming part of Letters Patent No. 14,894, dated May 13, 1856.

*To all whom it may concern:*

Be it known that I, HOSEA WILLARD, of Vergennes, in the county of Addison and State of Vermont, have invented a new and Improved Implement for Sowing Seed; and I do hereby declare that the following is a full, clear, and exact description of the same, reference being had to the annexed drawings, making a part of this specification, in which—

Figure 1:
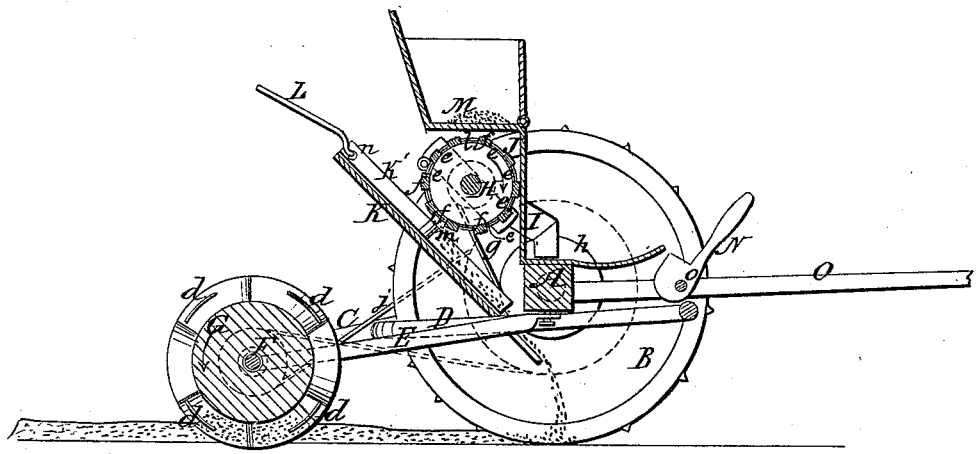
Figure 2:
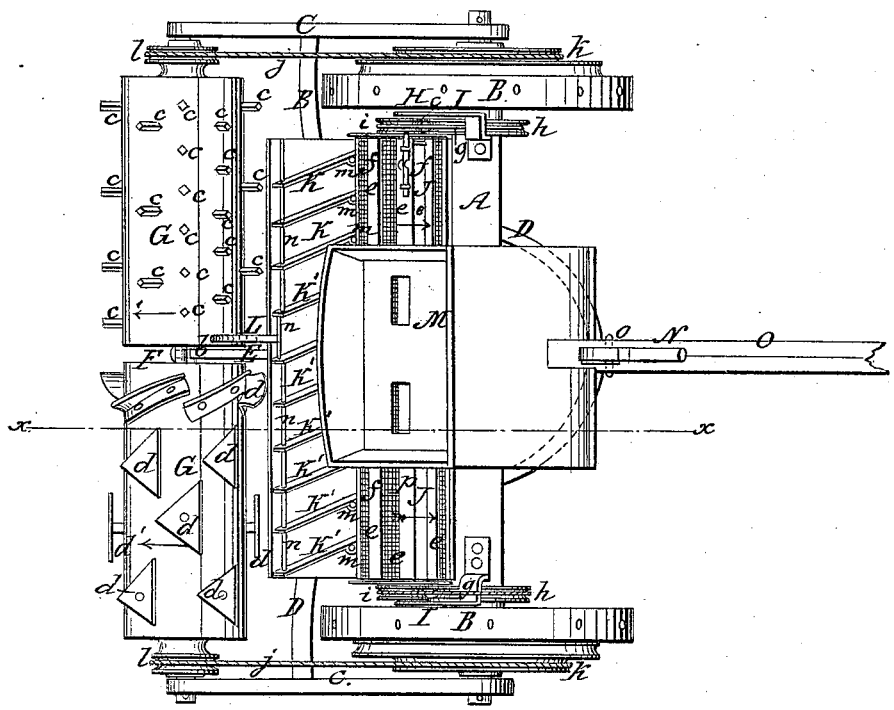

Figure 1 is a longitudinal vertical section of my improvement, the plane of section being shown at $x\,x$, Fig. 2. Fig. 2 is a plan or top view of the same.

Similar letters of reference indicate corresponding parts in the two figures.

My invention consists in the peculiar devices employed for distributing and also for covering the seed, as will be hereinafter fully shown and described.

To enable those skilled in the art to fully understand and construct my invention, I will proceed to describe it.

A represents the axle of the implement, and B B are the wheels.

C C are two arms, which are placed loosely one on each end of the axle A. These arms have rods D D attached to their inner ends, said rods extending forward of the axle and underneath it, the rods being connected at their outer ends.

E is a brace or arm, the front end of which is jointed or attached loosely to the under side of the axle A at its center, and the back end is connected to a rod, F, which is attached to the outer or back ends of the arms C C. The rod F is jointed at its center, as shown at $b$, Fig. 2. On the rod F there are placed loosely two cylinders or rollers, G G, having teeth or shears attached to their peripheries. In Fig. 2 one roller is provided with radial teeth $c$ and the other with shares $d$. Either may be used as desired.

H represents a shaft or rod, the ends of which are attached to inclined rods I I, secured to the upper surface of the axle A. On this shaft or rod there are placed two hollow cylindrical frames, J J, which have screens or sieves $e$ inserted in them, so as to form cylindrical screens. The screens or sieves are arranged so as to slide between the longitudinal strips $f$ of the cylindrical frames. The frames J J are allowed to rotate freely on the shaft or rod H, and are rotated by belts $g$, which pass around pulleys $h$ on the inner sides of the wheels B and around pulleys $i$ on the outer ends of the cylindrical frames J J.

The cylinders or rollers G G are rotated by belts $jj$, which pass around pulleys $k$, attached to the outer sides of the wheels B B, and around pulleys $l$ on the outer ends of the cylinders or rollers.

Directly back of the cylindrical frames J J there is secured an inclined board or plate, K, which has cleats K' pivoted to it at $m$. The upper ends of these cleats are connected by a rod, $n$, having a handle, L, attached to it.

M is the driver's seat, attached to the axle A.

N is a lever, which works on a pivot, $o$, in the back part of the tongue or draft-pole O.

The operation is as follows: The seed to be sown is placed within the frames or screens J J, and as the implement is drawn along the frames or screens will rotate in the direction indicated by the arrows. The seed will pass through the screens or sieves $e$, and will fall upon the inclined board or plate K and thence upon the ground. The board or plate K extends the whole width of the axle A and frames or screens J J. The cylinders or rollers G G rotate in the direction indicated by the arrows 1, and their rotation is in a reverse direction to the wheels B, as the belts $jj$ are cross-belts. The teeth or shares on the cylinders or rollers G cover or harrow the seed into the soil, and as these cylinders or rollers rotate in a reverse direction to the wheels B, their motion may be quite slow compared with that which would be required provided they rotated in the same direction as the wheels B.

By adjusting the cleats K' the seed may be inclined or thrown laterally in either direction, so that in passing over the side of a hill or eminence, when the inclination of the implement is obvious or considerable, the seed may be properly distributed upon the soil and not allowed to fall too compact, as would otherwise be the case.

By properly arranging the cleats K' the implement may be made to sow the seed either in drills or broadcast.

The cylinders or rollers may be raised above the soil, or their teeth or shares be allowed to penetrate it more or less deep, by operating the lever N. This is done by the foot of the driver, the lower part of the lever acting upon the outer ends of the rods D D.

More or less seed may be sown on a given surface by placing more or less screens or sieves in the cylindrical frames J J. When few screens or sieves are required boards may be substituted therefor.

The two cylindrical frames J J are used in order to insure an equal distribution of seed, for in turning the implement one frame will rotate while the other is stationary. The two cylinders or rollers G G will, in consequence of being upon a jointed rod or shaft F, rise or fall to correspond to the irregularities of the ground.

Having thus described my invention, what I claim as new, and desire to secure by Letters Patent, is—

The rotating cylindrical frames or screens J J, in combination with the inclined board or plate K, with pivoted cleats K', attached for the purpose of distributing the seed, and the cylinders or rollers G G, having teeth C or shares $d$ attached to their peripheries, substantially as described, for the purpose specified.

HOSEA WILLARD.

Witnesses:
GEO. W. GRANDEY,
MARY E. GRANDEY.